United States Patent
Guttman et al.

(10) Patent No.: US 7,031,259 B1
(45) Date of Patent: Apr. 18, 2006

(54) METHOD AND SYSTEM FOR SCHEDULING A TRANSMISSION OF COMPRESSIBLE AND NON-COMPRESSIBLE PACKETS

(75) Inventors: Ron Guttman, Zichron-Yaakon (IL); Ran Oz, Modiin (IL)

(73) Assignee: BigBand Networks, Inc., Redwood City, CA (US)

( * ) Notice: Subject to any disclaimer, the term of this patent is extended or adjusted under 35 U.S.C. 154(b) by 419 days.

(21) Appl. No.: 10/093,210

(22) Filed: Mar. 6, 2002

Related U.S. Application Data

(63) Continuation-in-part of application No. 09/579,551, filed on May 26, 2000, now Pat. No. 6,434,141.

(51) Int. Cl.
*H04J 1/16* (2006.01)

(52) U.S. Cl. .................. 370/235; 370/395.4; 370/468; 704/500

(58) Field of Classification Search ............... 370/235, 370/521, 356, 353–354, 468, 493–495, 444, 370/395.21, 395.4, 395.42, 395.43, 252; 704/500; 375/240; 348/384.1, 390.1
See application file for complete search history.

(56) References Cited

U.S. PATENT DOCUMENTS

| | | | | |
|---|---|---|---|---|
| 5,297,147 A | * | 3/1994 | Shimokasa | 375/241 |
| 5,982,748 A | * | 11/1999 | Yin et al. | 370/232 |
| 6,625,671 B1 | * | 9/2003 | Collette et al. | 710/52 |

* cited by examiner

*Primary Examiner*—Chi Pham
*Assistant Examiner*—Alexander O. Boakye
(74) *Attorney, Agent, or Firm*—Sonnenschein Nath & Rosenthal LLP

(57) ABSTRACT

A system and method for controlling the transmission of compressible packets, the method including the steps of: (a) receiving a packet that belongs to a stream; (b) determining a quality of service level of the stream; (c) scheduling a transmission of the packet during at least one time slot in response to the quality of service level, and (d) determining whether to compress the packet to provide a corresponding compressed packet, in response to at least one characteristic of at least one packet scheduled to be transmitted during the at least one time slot.

31 Claims, 6 Drawing Sheets

METHOD AND SYSTEM FOR SCHEDULING A TRANSMISSION OF COMPRESSIBLE AND NON-COMPRESSIBLE PACKETS

RELATED CASES

This patent application is a continuation-in-part which incorporates by reference and claims priority to U.S. patent application U.S. patent application Ser. No. 09/579,551, filed May 26, 2000 now U.S. Pat. No. 6,434,141.

FIELD OF THE INVENTION

The present invention relates to communication methods and systems in general, and to methods and systems for scheduling a transmission of packets such as compressible and non-compressible packets.

BACKGROUND OF THE INVENTION

Methods and systems for compressing and transmitting media signals are known in the art. Compressed digital video is largely becoming the preferred medium to transmit to video viewers everywhere. Part of the Moving Pictures Experts Group (MPEG) specifications are standardized methods for compressing and transmitting video. Various audio compression techniques are also known in the art. In general, MPEG is used today for transmitting video over terrestrial, wireless, satellite and cable communication channels and also for storing digital video.

An audio stream is organized as an ordered sequence of frames. A video stream is usually organized as an ordered sequence of pictures, each picture includes a plurality of pixels. A video picture includes a plurality of slices, each slice including a plurality of macro blocks. The audio and video streams are provided to an audio encoder and video encoder respectively to generate compressed audio and video elementary streams, also referred to as elementary streams.

MPEG compression/encoding utilizes various compression schemes, such as adaptive quantization, intra-frame encoding, inter-frame encoding, run length encoding and variable length coding. Intra-frame coding takes advantage of spatial redundancies in a picture. Inter-frame coding takes advantage of temporal redundancies from picture to picture in a video sequence. Inter-frame coding involves motion estimation and motion compensation. There are three types of motion estimations—forward, backward and bidirectional. Macroblocks are the elementary unit for motion compensation and adaptive quantization. Each macroblock is associated with a quantization factor field, representative of the degree of quantization. A slice, including a plurality of macroblocks includes a slice header that has a quantization factor field that is associated to some of the macro blocks of the slice.

Elementary streams are packetized to produce PES packets. PES packets made up of elementary streams that form a program share a common time base. The PES packets may also include additional information. PES packets of distinct elementary streams can be arranged as either a Program Stream or a Transport Stream. At least one or more stream of PES packets having a common base time are usually combined to a Program Stream. A Transport Stream combines one or more programs with one or more independent time bases into a single stream. Transport Streams include transport packets of 188 bytes. Transport Stream packets start with a transport packet header. The header includes a packet ID (PID). Transport Stream packets of one PID value carry data of a single elementary stream. Transport Streams include Program Specific Information (PSI) tables. The PSI tables specify which PIDs and accordingly which elementary streams are associated to form each program.

Transport Streams may be of either fixed or variable bit rate. Some programs of the Transport Stream are of a variable bit rate, if, for example, more bits are allocated to complex scenes, and less bits are allocated to more simple scenes.

Transport Streams are provided to a channel of a limited available bandwidth/storage space. The ISO/IEC 13818-1 specification defines a channel as a digital medium that stores or transports a Transport or a Program Stream. The aggregate bandwidth of all the components of the Transport Stream must not exceed, at any time, the available bandwidth of the channel.

Various lossy and lossless techniques are implemented to adapt the aggregate bandwidth of the programs of a Transport Stream to the available bandwidth of a channel. U.S. Pat. Nos. 6,038,256 and 6,192,083 of Linzer et al, U.S. Pat. Nos. 5,862,140 and 5,956,088 of Shen et al and U.S. Pat. No. 5,877,812 of Krause et al, describe some of these prior art methods. Lossless techniques, such as statistical multiplexing, do not require further compressing of media pictures. Lossless techniques also include delaying or advancing a transmission of transport packets. Lossy techniques involve additional compression, and are usually implemented whenever the appliance of lossless techniques is not feasible or does not provide sufficient results. The further compression usually results in visual quality degradation.

Systems and methods for providing guarantying quality of service, mainly for data streams are known in the art. Various methods for providing quality of service are illustrated at the following patents: U.S. Pat. No. 5,956,482 of Agraharam et al, U.S. Pat. No. 5,995,490 of Shaffer et al, U.S. Pat. No. 6,005,851 of Craddock et al, U.S. Pat. No. 6,028,842 of Chapman et al, and U.S. Pat. No. 6,246,702 of Fellman et al.

Prior art methods of providing quality of service guarantees did not utilize the bandwidth in an efficient manner as they did not implement compression techniques.

There is a need to provide a system and method for efficiently utilizing the bandwidth of communication channels and provide quality of service guarantees.

There is an efficient system and method for scheduling the transmission of compressible and non-compressible packets over a communication medium.

There is a need to provide a system and method for providing quality of service guarantees while utilizing compression techniques.

SUMMARY OF THE PRESENT INVENTION

The invention provides a system and a method for scheduling the transmission of packets, such as video, data and audio packets to guarantee predefined levels of quality of service for at least some of the packets streams. If the input bit rate of a compressible packet stream such as a video stream exceeds the allocated bit rate the video stream it can be compressed to provide a compressed video stream of a bit rate that does not exceed the allocated bit rate.

The invention provides a system and method for controlling the transmission of compressible packets, the method including the steps of: (a) receiving a packet that belongs to a stream; (b) determining a quality of service level of the stream; (c) scheduling a transmission of the packet during at least one time slot in response to the quality of service level; and (d) determining whether to compress at least one packet out of at least one packet scheduled to be transmitted during the at least one time slot out to provide a corresponding compressed packet, in response to at least one characteristic of at least one packet scheduled to be transmitted during the at least one time slot.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

Figure 1:
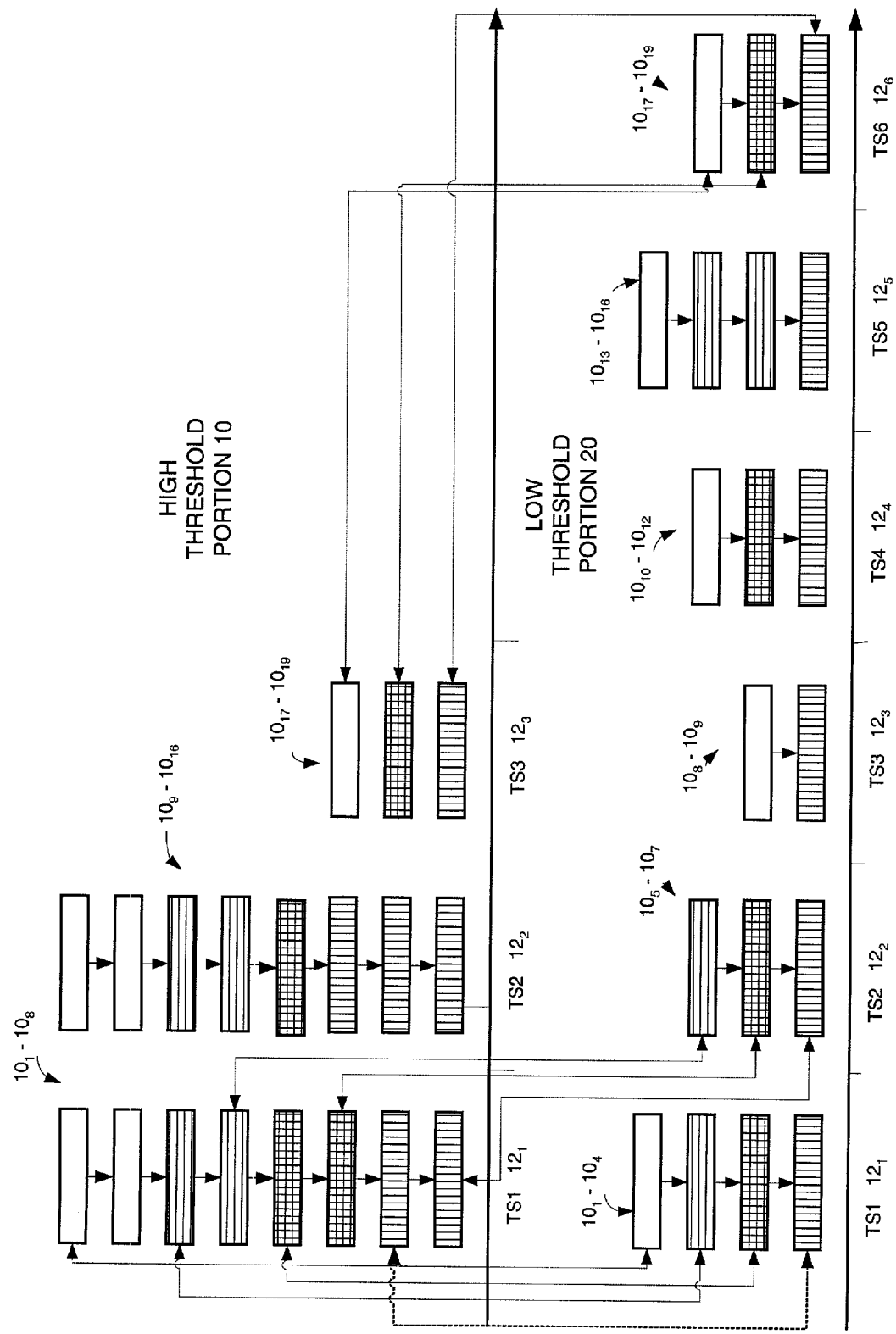
FIG. 1 is a schematic description of two portions of a scheduling table, in accordance with a preferred embodiment of the invention.

It should be noted that the particular terms and expressions employed and the particular structural and operational details disclosed in the detailed description and accompanying drawings are for illustrative purposes only and are not intended to in any way limit the scope of the invention as described in the appended claims.

The invention provides a method for scheduling the transmission of packets, such as video, data and audio packets to guarantee predefined levels of quality of service for at least some of the packets streams. If the input bit rate of a compressible packet stream such as a video stream exceeds the allocated bit rate the video stream it can be compressed to provide a compressed video stream of a bit rate that does not exceed the allocated bit rate.

The invention provides a system and method wherein a quality of service level is characterized by a low bit rate threshold and a high bit rate threshold.

The invention provides a scheduling scheme that schedules a transmission of packet streams in response to both the high and the low bit rate thresholds.

The invention provides a scheduling scheme that schedules the transmission of a packet during at least one time slots and then can determine to compress that packet or other packets scheduled to be transmitted during a time slot out of the at least one time slot in response to various limitations such as bandwidth/bit-rate limitations.

The invention provides a scheduling scheme that includes the steps of: receiving a packet that belongs to a packet stream, such as a data packet, audio packet or a video packet, determining the quality of service level associated with the stream; scheduling the transmission of the packet during at least one time slot in response to the quality of service level; determining whether to compress the packet in response to at least one characteristic of at least one packet scheduled to be transmitted during the at least one time slot; transmitting either the packet or a corresponding compressed packet in response to the determination.

The invention provides a system and a method wherein some of the quality of service levels reflect compression constraints, such as allowable compression levels, allowable quality of compressible streams and the like.

The invention provides a method whereas each quality of service level is associated with quality of service constraints. The scheduling of packets is responsive to the quality of service constraints. It is noted that a single packet stream can be associated with at least one set of quality of service constraints. Said quality of service constraints can reflect the type of service that is associated with the stream, communication medium limitation, end-user limitations, compression constraints and the like. A type of service can be electronic commerce applications, internet browsing applications, interactive TV services, broadcast on demand services, media broadcast and the like. End-user limitations can reflect the capabilities of the end user receiver, transmitter or processing unit. These units can be located within a set top box. End-user limitations can also reflect the current quality of service level that a vendor guaranteed to provide to the end-user. Compression constraints limit the amount of compression that can be applied on a compressible stream.

The invention provides a method in which one of the end-users limitations is reflected by a high bandwidth threshold. This threshold can be driven from set top boxes limitations, such as processing capacity limitations. For example, the set top box known as Explorer2000 of Scientific Atlanta is limited to 400 Kbps of in-band DSMCC data.

The invention provides a method for allocating bandwidth among a plurality of streams in response to the quality of service levels of each stream. The method allows dynamic adjustments of the bit rate allocation. For example, temporal unoccupied bandwidth, which was originally allocated for data, can be utilized for better quality video. Video streams can be re-compressed if a burst of high priority data suddenly arrives.

The invention provides a method for controlling the transmission of compressible packets, the method including the steps of: (a) Receiving a packet that belongs to a stream. (b) Determining a high bit rate threshold and low bit rate threshold associated with the stream. (c) Scheduling a transmission of the packet during a first time slot in response to the high bit rate threshold and during a second time slot in response to the low bit rate threshold. (d) Determining whether to compress the packet to provide a corresponding compressed packet, in response to at least one characteristic of at least one packet scheduled to be transmitted during the first time slot or the second time slot.

The invention provides a method that further includes a step of transmitting either the packet or a corresponding compressed packet in response to the determination.

The invention provides a method whereas the step of scheduling including a step of selecting a communication channel out of a plurality of communication channels to provide the packet.

The invention provides a method whereas the step of determining including a step of determining whether to compress the packet to provide a corresponding compressed packet, in response to at least one characteristic of at least one packet scheduled to be provided to the selected communication channel during the first time slot or the second time slot. Usually, the determination including a comparison between an aggregate size of the at least one packet scheduled to be provided to the selected communication channel during a time slot out of the first time slot and the second time slot and an available capacity of the selected communication channel during the time slot.

The invention provides a method whereas at least one bit rate threshold out the high bit rate threshold and the low bit rate threshold reflects a quality level of the stream or a compression level of the stream.

It is noted that received packets, such as but not limited to, Transport Packets can be grouped to provide packet groups that represent macroblock groups, slices, access units or pictures, and that each group of packets can be treated as an elementary unit for scheduling and/or compressing.

Referring to FIG. 1 that illustrates two portions 10 and 20 of scheduling table 8. The upper portion of scheduling table 8 is referred to as high threshold portion 10, while the lower portion is referred to as low threshold portion 20. It is noted that scheduling table 8 can include various representations of the scheduled packets. It is assumed that scheduling table 8 includes packet identifiers, each for representing a transmission of a single packet.

Low threshold portion 20 illustrates the scheduling of a plurality of data packets, such as PS1–PS19, in response to low bit rate thresholds. PS1–PS19 are identified by packet identifiers $10_1$–$10_{19}$. low threshold portion 20 illustrates the last time for transmitting packets in view of the quality of service levels assigned to packet sequences. Packet identifiers of packets that are scheduled to be transmitted during the same time slot are arranged in a single row. The six rows of low threshold portion 20 illustrate six distinct time slots $TS_1$–$TS_6$ $12_1$–$12_6$. Conveniently, the packet identifiers within each row are ordered in view of the packets priority.

The first row of low threshold portion 20 includes packet identifiers $10_1$–$10_4$ illustrating that packets PS1–PS4 are scheduled to be transmitted during TS1 $12_1$, packet identifiers $10_5$–$10_7$ illustrate that packets PS5–PS7 are scheduled to be transmitted during TS2 $12_2$, packet identifiers $10_8$–$10_9$ illustrate that packets PS8–PS9 are scheduled to be transmitted during TS3 $12_3$, packet identifiers $10_{10}$–$10_{12}$ illustrate that packets PS10–PS12 are scheduled to be transmitted during TS4 $12_4$, packet identifiers $10_{13}$–$10_{16}$ illustrate that packets PS13–PS16 are scheduled to be transmitted during TS5 $12_5$ and packet identifiers $10_{17}$–$10_{19}$ illustrate that packets PS17–PS19 are scheduled to be transmitted during TS6 $12_6$. Each sequence is characterized by a quality of service level and accordingly by a low bit rate threshold that must be allocated to the sequence. A quality of service violation may occur if a packet is transmitted after the scheduled time slot.

The distance between two consecutive packet identifiers of two packets that belong to the same stream usually reflect the low bit rate threshold of the sequence. For example, assuming that packets PS1 and PS17 belong to the same stream then the low bit rate threshold equals 5*|TS|. |TS| being the length (in seconds) of a time slot.

Each packet has a predefined priority. For example, referring to FIG. 1, packets of the highest priority are illustrated by blank packet identifiers, such as $10_1$, $10_8$, $10_{10}$, $10_{13}$ and $10_{17}$. Packets of a second priority level are illustrated by packet indicators that include horizontal lines. Packets of a third priority are illustrates by packet identifiers that include grids. Packets of the lowest priority level are illustrated by packet identifiers that include vertical lines.

Each packet is characterized by packet characteristics. The packet characteristics can relate to the packet itself or to the stream to which that packet belongs. Packet characteristics can include priority, quality of service level, size, packet type (compressible or not), timing information and the like. The quality of service level characteristic can include low bit rate threshold, high bit rate threshold. The timing characteristics can include upper time limit for transmitting the packet. The timing information can include information reflecting said upper time limit, such a decoding time stamp, presentation time stamp and the like. Some of the packet characteristics can be included within the packet identifier, but this is not necessary. If a packet characteristic is not included within the packet identifier, the packet identifier must include retrieval information that allows for retrieving the packet characteristic.

The packet characteristics are used for scheduling the packet transmission, such as for placing packet identifiers in scheduling tables such as scheduling table 8, and for selecting for transmission a packet out of a plurality of packets that are scheduled to be transmitted during the same time slot or even during at least the same set of time slots.

Each packet identifier is linked to the next packet identifier within the same row of low threshold portion 20 and to a corresponding packet identifier located within high threshold portion 10. The corresponding packet identifier reflects the transmission of the same packet as the packet identifier, but in response to an upper bit rate threshold. Accordingly, when a packet is transmitted both its packet identifier the corresponding packet identifier are erased. For example, packet identifier 101 of low threshold portion 20 and packet identifier $10'_1$ identify packet PR1. These links allow for transmission of a sequence of packets by locating a packet identifier and "jumping" to the next linked packet identifier.

High threshold portion 10 illustrates the scheduling of packets PS1–PS19 that are identified by packet identifiers $10'_1$–$10'_{19}$ in response to a high bit rate thresholds. This portion illustrates the minimal time limits for transmitting packets in view of the quality of service levels assigned to packet sequences.

Packet identifiers $10'_1$–$10'_8$ illustrate that packets PS1–PS8 are scheduled to be transmitted during TS1 $12_1$, packet identifiers $10'_9$–$10'_{16}$ illustrate that packets PS9–PS16 are scheduled to be transmitted during TS2 $12_2$, and packet identifiers $10_{17}$–$10_{19}$ illustrate that packets PS17–PS19 are scheduled to be transmitted during TS3 $12_3$.

The scheduling table 8 is updated by entering packet identifiers in response to a reception of packets and in response to quality of service constraints associated with streams of the received packets.

Packet characteristics, such as quality of service constraints and the like can be stored with the packet identifier or in an additional database. When a packet is received the quality of service constraints are fetched from the database to be utilized in the scheduling process. For example, assuming that (i) packet PS17 is received, (ii) packet PS1 was scheduled to be transmitted during TS1, (iii) packets PS1 and PS17 belong to the same stream, (iv) the low bit rate threshold of that stream equals 5*|TS|, (v) the high threshold of that stream equals 2*|TS|, then packet PS17 is scheduled to be transmitted during TS6 in low threshold portion 10 and is scheduled to be transmitted during TS3 in high threshold portion 20. It is noted that the high and low bit rate threshold can be stored in the data base as they are required only for placing packet identifiers within the scheduling table.

A packet identifier usually includes information that can be used during the steps that occur after the scheduling of a transmission of a packet. These steps can include determining which packet to compress, prioritizing the transmission of packets, retrieval of packets to be transmitted, and the like. Such information can include the location of a data packet in memory, packet priority, the type of packet (compressible or not).

Figure 2:
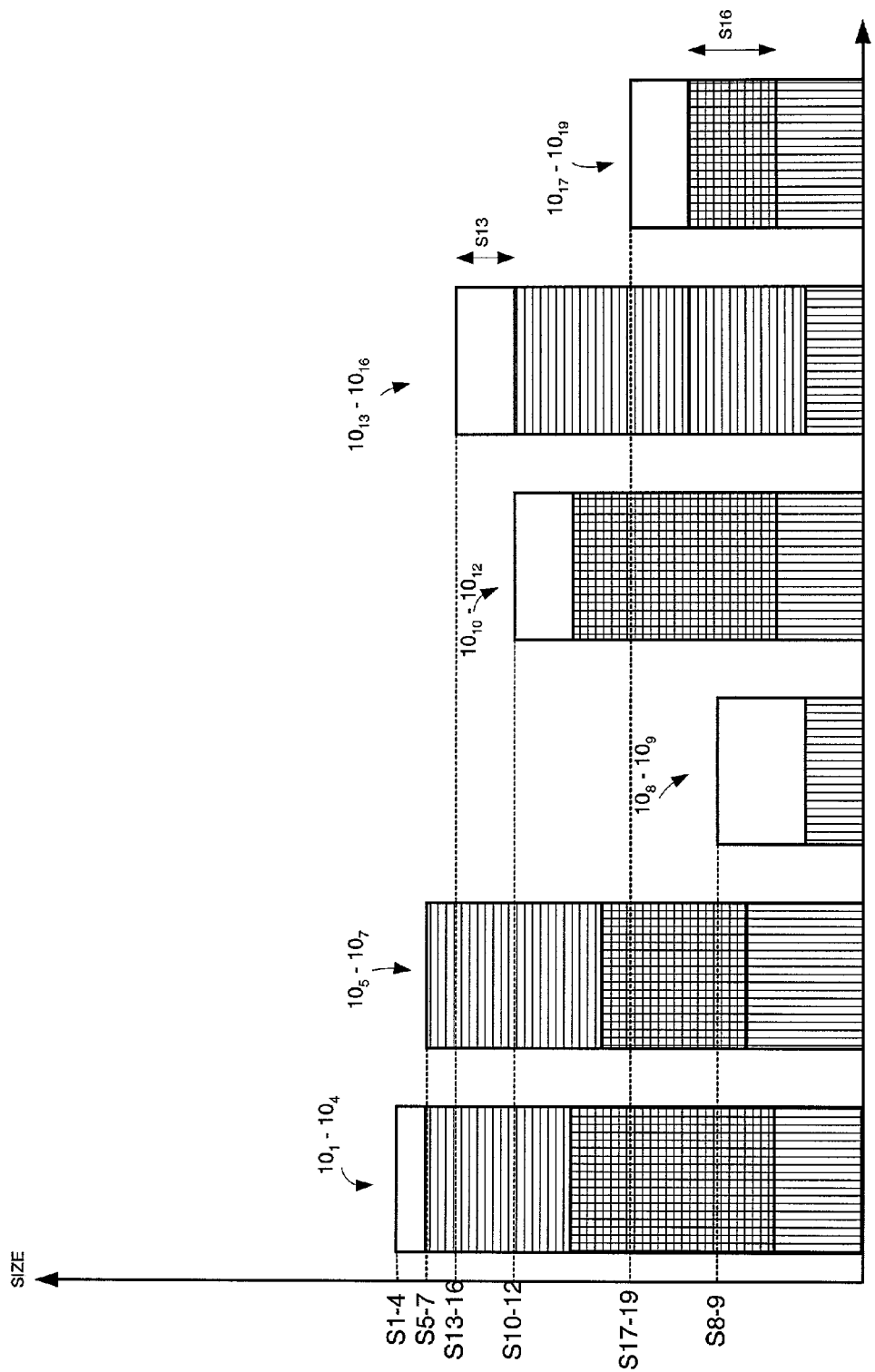
FIG. 2 is a schematic description illustrating the sizes of packets that are scheduled to be transmitted, in accordance with a preferred embodiment of the invention.

Referring to FIG. 2 illustrating the sizes of packets that are scheduled to be transmitted during six consecutive time slots.

A size limit (SZ) is defined for each time slot. This size limit reflects the maximal amount of data that can be transmitted during the time slot. The aggregate size ($AG_i$) of packets that are scheduled to be transmitted during time slot $TS_i$ must not exceed size limit $SZ_i$. $SZ_i = |TS_i| * BR_i$, whereas $|TS_i|$ is the length (in seconds) of the time slot, $BR_i$ is the aggregate available bit rate during $TS_i$.

If $AG_i$ exceeds $SZ_i$ either a quality of service violation occurs or $AG_i$ is adjusted such that is does not exceed $SZ_i$. The adjustment requires at least one packet out of the plurality of packets scheduled to be transmitted during $TS_i$ to be compressed. This compression can be performed only if if at least some of the packets are compressible. The amount of compression and the selection of which packet to compress can be made in various manners, such as in response to the packets priority.

FIG. 2 illustrates packets of varying size. Each packet is represented by a box, whereas the volume of each box represents the size of the packet. The aggregate size of packets PS1–PS4 is denoted $AG_1$, the aggregate size of packets PS5–PS7 is denoted $AG_2$, the aggregate size of packets PS8–PS9 is denoted $AG_3$, the aggregate size of packets PS10–PS12 is denoted $AG_4$, the aggregate size of packets PS13–PS16 is denoted $AG_5$, and the aggregate size of packets PS17–PS19 is denoted $AG_6$. It is noted that the size of compressible packets reduces after a packet is compressed.

If $SZ_1 = AG_1$ then during $TS_1$ packets PS1–PS4 can be transmitted. If $SZ_1 > AG_1$ then packets PS1–PS4 can be transmitted during $TS_1$. The difference ($D_1$) between $SZ_1$ and $AG_1$ can be used to transmit additional packets that must be transmitted during later time slots. These additional packets are identified by packet identifiers, such as $10'_5$–$10'_8$ of high threshold portion 20. If $SZ_1 < AG_1$ then $AG_1$ is decreased such that it does not exceed $SZ_1$ by compressing at least one compressible packet out of PS1–PS4.

According to an aspect of the invention schedule table is arranged as a hash table, whereas a cyclic pointer reflecting time is used as a key to the schedule table entries. Referring to the example set forth in FIG. 1, the time is used to a key to each of high threshold portion 10 and low threshold portion 20. Conveniently, consecutive time entries are spaced by a time period that allows for transmitting a plurality of packets.

At a given current time T, an entry of low threshold portion 20 that is keyed by current time T is retrieved. The entry is checked to determine which packets to transmit. For example, referring to the example set forth in FIG. 1, the during the first time slot TS1, a first entry of low threshold portion 20 is retrieved and accordingly packets PS1–PS4 are sequentially transmitted. It is noted that as there packets are transmitted pointers $10_1$–$10_4$ within the first entry of low threshold portion 20 and pointers $10'_1$–$10'_4$ of the first entry of high threshold portion 10 are deleted and the pointers of their "neighbors" may be updated. After packet PS4 is transmitted the first entry is empty. If no more packets can be sent during this time slot the transmission of additional packet must wait until the next time slot TS2. Assuming that additional packets can be transmitted the method checks the first entry of high threshold portion 10. At this stage the first entry includes pointers $10'_5$–$10'_8$. At least one of packets PS5–PS8 are transmitted during the first time slot, and the associated pointers, in both low threshold portion 10 and high threshold portion 20 are deleted. Assuming that PS5 and PS6 were transmitted during TS1 then pointers $10_5$ and $10_6$ of the second entry of low threshold portion 20 and pointers $10_5'$ and $10_6'$ of high threshold portion 10 are deleted. Conveniently, the scheduling table has also a plurality of entries for scheduling a transmission of audio packets, PSI packets and the like.

According to another aspect of the invention "old" packets are deleted. The deletion can prevent storage unit overflows. An "old" packet is a packet that is stored in the scheduling table (or has an associated pointer or reference stored in the scheduling table) for a time period that exceeds a predefined time threshold. As time is used as a key to the scheduling table the predefined time threshold can be translated to a space between entries of the scheduling table.

It is noted that if not all the packets scheduled to be transmitted during a time slot can be transmitted there is a need to transmit the remaining packets scheduled to be transmitted during that time slot, instead of starting to transmit packets scheduled to be transmitted during the next time slot. In such cases time alone cannot be used as a key to the low threshold portion. Conveniently, an updated pointer reflecting the next packet to be transmitted can replace the time as a key to the scheduling table.

According to another aspect of the invention two cyclic pointers P1 12 and P2 22 can be used to scan low threshold portion 10 and high threshold portion 20 accordingly. Both pointers advance each time slot and within a time slot. The pointers point to the next packet to be transmitted. The transmission at a given time slot starts by transmitting the packets that are pointed by P1 12. It is noted that using cyclic pointers to scan a scheduling table in known in the art. See: U.S. Pat. No. 6,167,057 of Hagai et al.

A single scheduling table can be used to schedule the transmission of packets of various kinds (video, audio, data), but this is not necessary. Conveniently, the scheduling table has separate portions to packets that are time constrained and to those who are not time constrained.

The scheduling can be responsive to relations between packets. For example, the provision of audio packets to an end user decoder may be synchronized with the provision of video packets to the end users video decoder. The relationship can be reflected by links between packets that are represented at different portions of the scheduling table.

The scheduling of transmission of packets that belong to a first packet stream can influence the scheduling of packets that belong to a second packet stream. This usually occurs when there is at least a partial overlap between the end users that receive the first packet stream and the end users that receive the second packet streams. The scheduling of the first and second streams must comply with the quality of service constraints associated with each of the two packet streams. For example, an end user that is receiving packets that belong to the first stream decides to start receiving packets of a second stream. Assuming that the second stream can be provided to the end user then the scheduling of both streams must take into account various constraints such as the end users constraints.

The amount of data packets that can be transmitted from each kind of packet during a given time slot reflects the bit rate allocated to that kind of packets. Changes in the bit rate allocation can require changing the scheduling scheme and may even require compressing compressible packets such as video packets and/or audio packets. These changes are reflected in the size parameter of packets that are scheduled to be transmitted.

Figure 3:
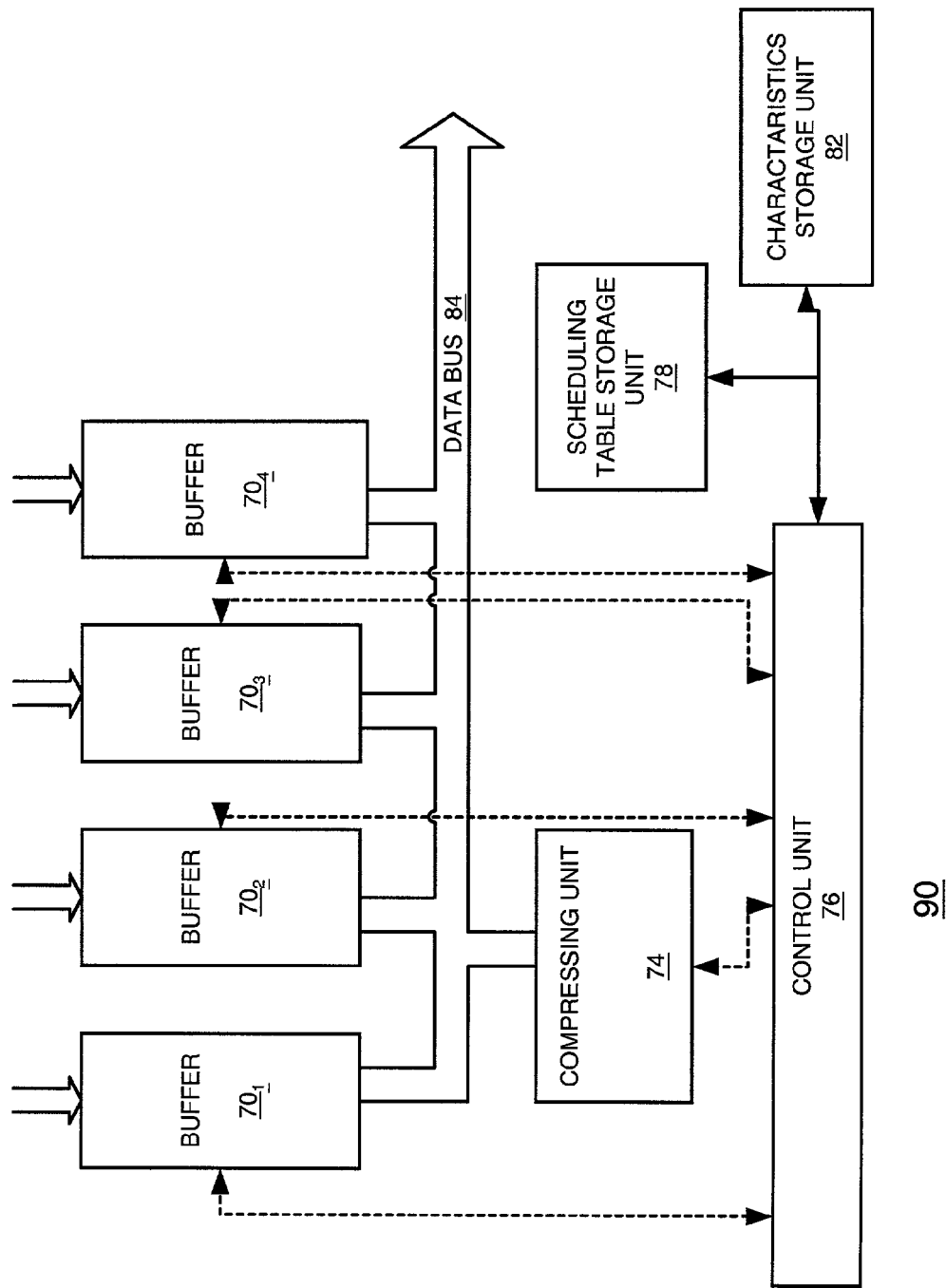
FIG. 3 is a schematic description of a scheduling table, controller and buffers, in accordance with a preferred embodiment of the invention.

Referring to FIG. 3 illustrating system 90 for scheduling the transmission of packets and compressing compressible packets, in accordance with a preferred embodiment of the invention.

System 90 includes a plurality of buffers, such as buffers $70_1$–$70_4$, compressing unit 74, control unit 76, scheduling table storage unit 78, characteristic storage unit 82 data bus 84 and a plurality of control and status buses, illustrated by dashed lines.

Each of buffers $70_1$–$70_4$ has a control port for receiving control signals from control unit 76 and for providing to control unit 76 status signals. The status signal can reflect a reception of a new packet, the new packet characteristics and/or the fullness of the buffer. Each of said buffers further has an input port for receiving packets, as illustrated by the vertical arrows that are connected to the upper part of each buffer $70_1$–$70_4$. Each buffer has an I/O port, that is coupled to bidirectional data bus 84 for (i) providing packets to be transmitted, (ii) for providing packets to compressing unit 74 to be compressed to provide corresponding compressed packets, and (iii) for receiving the corresponding compressed packets.

Compression unit 74 has an I/O port coupled to data bus 84 for receiving packets, and providing the buffer that provided the packet a corresponding compressed packet. It is noted that compressing unit 74 can re-compress an already compressed packet. Compression unit 74 is coupled to control unit 76 for receiving control signals for controlling the compression process and for providing control unit signals reflecting the compression process. These signals can include an updated size and optionally an updated quality of the compressed packet. Conveniently, the update size and updated quality are sent to scheduling table storage unit 78 via control unit 76 and replace the size and quality of the packet prior to the compression.

According to another aspect of the invention each received packet is provided to compression unit 74 that applies at least one compression scheme, such as compressing the packet by at least one compression ratio to provide at least one compresses packet. Each of the at least one compressed packets is stored at a storage unit, such as he buffer that provided the packet, and control unit 76 selects which packet out of the original packet or a compressed packet to transmit. For example, assuming that each packet is compressed by two compression ratios to provide a first compressed packet and a second compressed packet. These two compressed packet are stored at a storage unit and control unit 76 selects which packet out of the packet, the first compressed packet and te second compressed packet to transmitt. Commonly the compression ratios differ by a factor of two. This aspect of the invention allows for speeding up the process of scheduling and transmiting pckets as the step of compressing is relatively time consuming.

According to another aspect of the invention the control unit schedules to transmit each packet and each compressed version of the packet during at least one time slot. The packets are scheduled to be transmitted according to their compression factor, starting with the packet. Referring to the example set forth in FIG. 1, and assuming that only a single compressed version of the packet exists then the packet is scheduled to be transmitted at the high threshold portion and the compressed version is scheduled to be transmitted during a succeeding time slot in the low threshold portion. If there is enough bandwidth the pcket is transmitted, else the compressed version of the packet is transmitted.

Control unit 76 is coupled to scheduling table storage unit 78 and characteristics storage unit 82 for building and updating a schedule table, such as schedule table 8 of FIG. 1, and database 81 that are stored in scheduling table storage unit 78 and characteristics storage unit 82 respectively. Control unit 76 accesses scheduling table 8 for controlling the transmission of packets from buffers $70_1$–$70_4$. When a packet has to be transmitted, according to the scheduling table, control unit sends a transmit control to the appropriate buffer.

Figure 5:
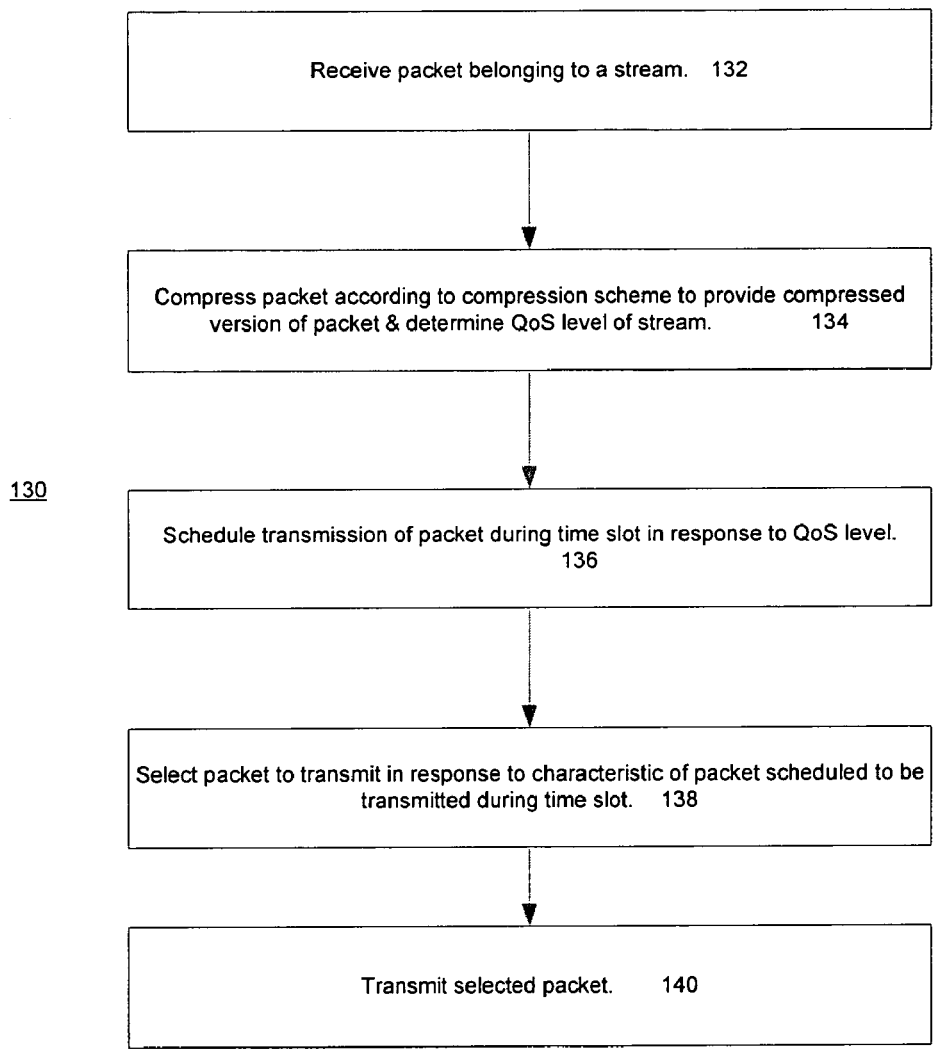

Referring to FIG. 5 illustrating in greater details packet identifier $10_2$ and an entry $81_2$ of data base 81 that is stored within characteristic storage unit 82.

Packet identifier $10_2$ is stored within the first row of low threshold portion 20. It has a priority field $10_{2,1}$, an address field $10_{2,2}$, pointing to the location of packet PS2 in buffers $70_1$-7-$_4$, a next link field $10_{2,3}$ pointing to the next packet identifier (which is $10_3$), a corresponding link field $10_{2,4}$ pointing to packet identifier $10_2'$, a characteristic field $10_{2,5}$ pointing to entry $81_2$ that stores packet characteristics that are not included within packet identifier $10_2$. Packet identifier $10_2$ also includes type field $10_{2,6}$ indicating whether the packet is compressible or not, size field $10_{2,7}$ indicative of the size of the packet and quality field $10_{2,8}$. The last two fields are updated if the packet is compressed.

Entry $81_2$ includes characteristics that are not stored within packet identifier $10_2$, such as quality of service level associated with the stream to which the packet belongs, and a plurality of quality of service constraints associated with the quality of service level, such as but not limited to a high bit rate threshold and a low bit rate threshold.

Figure 4:
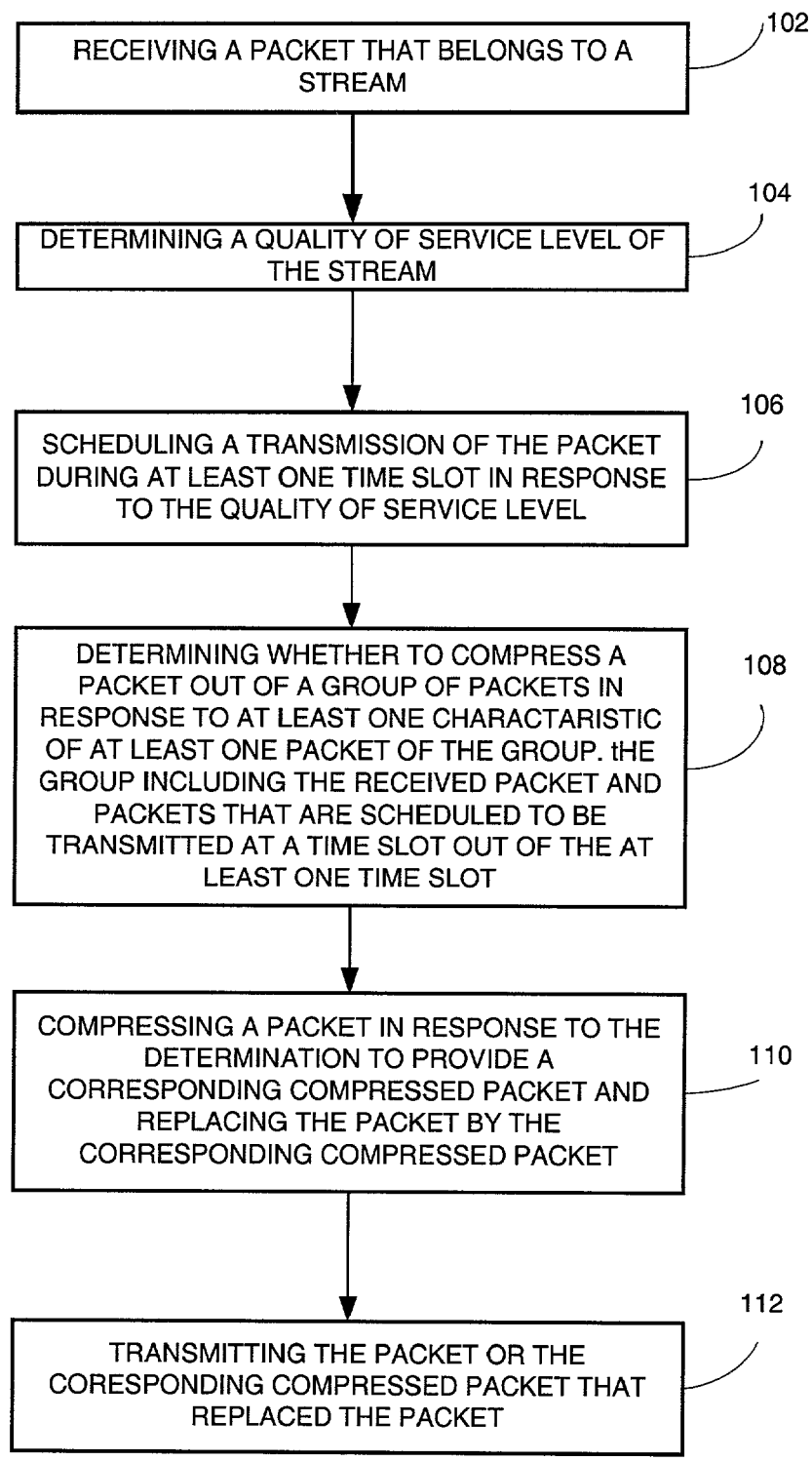
FIGS. 4–6 are flow charts illustrating methods for scheduling the transmission of compressible and non compressible packets, in accordance with a preferred embodiment of the invention.

Referring to FIG. 4 illustrating method 100 for scheduling the transmission of packets, such as compressible and non-compressible packets, in accordance with a preferred embodiment of the invention.

Method 100 starts at step 102 of receiving a packet that belongs to a stream. Referring to the example set forth at FIG. 3, a packet is received at one of the input ports of a buffer out of buffers $70_1$–$70_4$. It is assumed that the packet is received at the input port of buffer $70_1$. Buffer $70_1$ sends status signals to control unit 76 indicative of the reception of the packet and provides additional information for allowing control unit 76 to determine the flow and accordingly the quality of service level associated with that flow. The additional information can include portions of the packet header, the packet source and/or destination address, the packets identification information, and the like. It is noted that received packets, such as but not limited to, Transport Packets can be grouped to provide packet groups that represent macroblock groups, slices, access units or pictures, and that each group of packets can be treated as an elementary unit for scheduling and/or compressing.

Step 102 is followed by step 104 of determining a quality of service level of the stream. Referring to the example set forth at FIG. 3, control unit 76 determines the quality of service associated with the stream.

Step 104 is followed by step 106 of scheduling a transmission of the packet during at least one time slot in response to the quality of service level. Referring to the example set forth at FIG. 3 control unit 76 accesses database 81 and retrieves the constraints associated with the stream. There can include high bit thresholds, low bit thresholds and the like. Control unit 76 also accesses scheduling table 8 and determines which when is the last packet from that stream scheduled to be transmitted, what are the values of cyclic pointers P1 12 and P2 22 and accordingly determines when to schedule the transmission of the received packet.

Step 106 is followed by step 108 of determining whether to compress a packet out of a group that includes the packet and at least one packet scheduled to be transmitted a time slot out of the at least one time slot to provide a corresponding compressed packet, in response to at least one characteristic of at least one packet scheduled to be transmitted during a time slot out of the at least one time slot. Referring to the example set forth at FIG. 3, and assuming that received packet is PS4 and that SZ1 is smaller than S1-4 then control unit 76 has to determine which of packets PS1–PS4, all scheduled to be transmitted during TS1 to compress such that S1-4 does not exceed SZ1. The decision of which packet to compress depends on that packet being a compressible packet and upon at least one characteristic of these packets.

The at least one characteristics can include timing information, such as urgency, an upper time limit to be transmitted and the like. The at least one characteristic can reflect the priority of the packets stream. This can be a transmission priority or a compression priority and the like. It is noted that If that size reduction cannot be done an error message indicating of a quality of service violation may be generated and PS1–PS4 may be transmitted or not in accordance to a predefined policy.

Method 100 can further include steps 110 and 112. Step 110 including compressing a packet in response to the determination of step 108 to provide a corresponding compressed packet. The corresponding compressed packet replaces the packet.

According to another aspect of the invention the corresponding compressed packet does not replace the packet and either one can be transmitted. Referring to the example set forth at FIG. 3, a predefined buffer can store compressed packets, and control unit 76 can schedule the transmission of a packet and of a corresponding compressed packet and decide which packet to transmit eventually. The packet identifiers of the packet and corresponding compressed packets are linked so that when either one is transmitted the packet identifiers of him and the linked packet are erased.

Step 110 is followed by step 110 of transmitting either the packet or a corresponding compressed packet.

Although FIG. 3 illustrates a single data bus the packets can be provided to a plurality of communication channels. In such a case the aggregate size and other characteristics of packet scheduled to be transmitted over the same communication channel have to be taken into account when scheduling the transmission and determining a compression of packets. In such cases a packet and at least one packet are scheduled to be transmitted over a communication channel during a same time slot and step 108 can include determining to compress a packet out of a group including of the packet and at least one packet, if an aggregate size of the group exceeds the capacity of the communication channel.

Referring to FIG. 5 illustrating method 130 for scheduling the transmission of packets, such as compressible and non-compressible packets, in accordance with a preferred embodiment of the invention.

Method 130 starts at step 132 of receiving a packet that belongs to a stream.

Step 132 is followed by step 134 of compressing the packet according to at least one compression scheme to provide at least one compressed version of the packet and of determining a quality of service level of the stream.

Step 134 is followed by step 136 of scheduling a transmission of a packet to be selected out of the packet and the a least one compressed version of the packet, during at least one time slot in response to the quality of service level.

Step 136 is followed by step 138 of selecting which packet out of the packet or at least one compressed version of the packet to transmit, in response to at least one characteristic of at least one packet scheduled to be transmitted during a time slot out of the at least one time slot during which the pcket is scheduled to be transmitted.

Step 138 is followed by step 140 of transmitting the selected packet.

Figure 6:
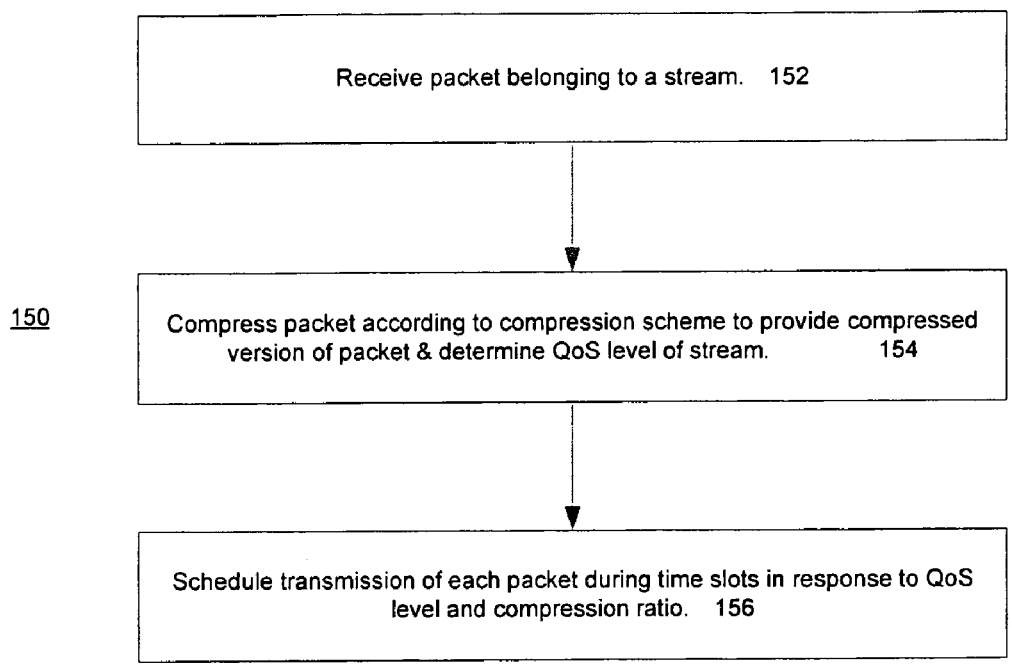

Referring to FIG. 6 illustrating method 150 for scheduling the transmission of packets, such as compressible and non-compressible packets, in accordance with a preferred embodiment of the invention.

Method 150 starts at step 152 of receiving a packet that belongs to a stream.

Step 152 is followed by step 154 of compressing the packet according to at least one compression scheme to provide at least one compressed version of the packet and of determining a quality of service level of the stream.

Step 154 is followed by step 156 of scheduling a transmission of each packet out of the packet and the at least one compressed version of the packet during at least one time slot in response to the quality of service level and the compression ratio associated with each packet.

Step 156 is followed by step 158 of transmitting a packet out of the packet and the at least one compressed version of the packet in response to the scheduling of step 156.

It is noted that at least some of the quality of service levels are associated with at least one bit rate threshold for transmitting packets belonging to a stream. Referring to the example set forth in FIG. 1, it assumed that a quality of service level is associated with a high bit rate threshold and a low bit rate threshold. These two bit rate thresholds are reflected by portions 10 and 20 of scheduling table 8. Accordingly, step 106 of scheduling including scheduling the transmission of a received packet during a time slot in response to the high bit rate threshold and scheduling the transmission of a received packet during a time slot in response to the low bit rate threshold.

The bit rate allocation can be responsive to quality of service constraints and to the status of various kinds of packets. The following bit allocation schemes represent examples of possible bit rate allocation schemes. It is noted that the invention is not limited to these exemplary bit rate allocation schemes:

(a) Allocating to the data packet streams and audio packet streams a constant bit rate that reflects the maximal bit rate of each stream. Each video stream will be allocated a bit rate that is not smaller than the low threshold bit rate. Video stream peaks can be handled by compressing video packets.

(b) Allocating to the data packets streams and audio streams a constant bit rate that reflects the low threshold bit rate.

(c) Allocating a bit rate in response to a current status or estimated status of pending packets of at least one kind of packets. The status can relate to an aggregate size of pending packets of the same kind of packet or to an estimated aggregate size of pending packets of the same kind of packets. For example, if a large amount of video packets exist, the bit rate allocated to the video packet transmission can be increased, as long as the bit rate allocated to the audio and data packet streams is not lower than their respective low threshold bit rate.

Referring to the example set forth in FIG. 3, it is assumed that each buffer out of buffers $70_1$–$70_4$ stored packets of a single type, such a video packets, audio packets, data packets and the like. Control unit 67 can schedule the transmission of packets in response to a bit rate allocation. The bit rate allocation can be responsive to the status or an estimated status of buffers $70_1$–$70_4$.

According to another aspect of the invention packets are switched across a switch or router that is managed by a session manager. Such a router can be a broadband multimedia router is described at U.S. patent application Ser. No. 09/579,551, titled "communication management system and method", filed May 26 200 which is incorporated by reference.

Packets are scheduled to be transmitted only if a session for switching the packets stream across the switch was approved. These streams are referred to as approved streams.

When a packet is received it is checked to determine to which stream the packet belongs. If the packet belongs to an approved stream, the stream identity can determine the packets characteristics, such as quality of service constraints. A session is approved if the system resources can support the existing approved sessions and the requested session. This issue can be examined in view of the current behavior of the approved sessions, a predicted behavior of the approved sessions and/or the requested session, a previous behavior of the approved sessions and/or the requested session, and in view of quality of service constraints associated with the approved sessions and the requested session.

The following describes exemplary terms for approving a session. (i) A session can be approved only if the sum of minimal bit rate that is guaranteed to each stream can be supported by the switch. (ii) A session can be approved only if the sum of minimal bit rates that is guaranteed to each stream does not exceed a predetermined fraction of the bit rate that can be supported by the switch. The lower the fraction is the system can statistically provide better quality of service.

(iii) A session can be approved in response to the size of packets of various types, or to the estimated size of said packets. The size of the packets and the changes in the size of a stream over time can be learnt from the scheduling table itself of from the database that stores packet characteristics.

It will be apparent to those skilled in the art that the disclosed subject matter may be modified in numerous ways and may assume many embodiments other then the preferred form specifically set out and described above.

Accordingly, the above disclosed subject matter is to be considered illustrative and not restrictive, and to the maximum extent allowed by law, it is intended by the appended claims to cover all such modifications and other embodiments, which fall within the true spirit and scope of the present invention.

The scope of the invention is to be determined by the broadest permissible interpretation of the following claims and their equivalents rather then the foregoing detailed description.

The invention claimed is:

1. A method for controlling the transmission of packets, the method comprising the steps of:
   receiving a packet that belongs to a stream;
   determining a quality of service level of the stream;
   scheduling a transmission of the packet during at least one time slot in response to the quality of service level;
   determining whether to compress the packet to provide a corresponding compressed packet, in response to at least one characteristic of at least one packet scheduled to be transmitted during the at least one time slot, wherein the determination includes a comparison between an aggregate size of the at least one packet scheduled to be provided to a selected communication channel during a time slot out of the at least one time slot and an available capacity of the selected communication channel during the time slot.

2. The method of claim 1 further comprising a step of transmitting either the packet or a corresponding compressed packet in response to the determination.

3. The method of claim 1 wherein the step of scheduling comprising selecting the selected communication channel out of a plurality of communication channels to provide the packet.

4. The method of claim 1 wherein the at least one characteristic comprises packet size.

5. The method of claim 1 wherein at least one quality of service level reflects quality level of the stream.

6. The method of claim 1 wherein at least one quality of service level reflects compression level of a stream.

7. A method for controlling the transmission of packets, the method comprising the steps of:
   receiving a packet that belongs to a stream;
   determining a quality of service level of the stream;
   scheduling a transmission of the packet during at least one time slot in response to the quality of service level;
   determining whether to compress the packet to provide a corresponding compressed packet, in response to at least one characteristic of at least one packet scheduled to be transmitted during the at least one time slot;
   wherein the step of scheduling comprising a step of selecting a communication channel out of a plurality of communication channels to provide the packet;
   wherein the step of determining comprising a step of determining whether to compress the packet to provide a corresponding compressed packet, in response to at least one characteristic of at least one packet scheduled to be provided to the selected communication channel during the at least one time slot; and
   wherein the determination comprising a comparison between an aggregate size of the at least one packet scheduled to be provided to the selected communication channel during a time slot out of the at least one time slot and an available capacity of the selected communication channel during the time slot.

8. The method of claim 1 wherein the at least one characteristics comprising timing information.

9. The method of claim 8 wherein the timing information reflecting an upper time limit for transmitting the packet.

10. The method of claim 1 wherein the at least one characteristics comprise priority information.

11. The method of claim 1 wherein each quality of service level is associated with at least one bit rate threshold for transmitting packets belonging to a stream.

12. A method for controlling the transmission of packets, the method comprising the steps of:
   receiving a packet that belongs to a stream;
   determining the quality of service level of the stream;
   scheduling a transmission of the packet during at least one time slot in response to the quality of service level;
   determining whether to compress the packet to provide a corresponding compressed packet, in response to at least one characteristic of at least one packet scheduled to be transmitted during the at least one time slot; wherein each quality of service level is associated with at least one bit rate threshold for transmitting packets belonging to a stream; wherein the at least one bit rate threshold comprising a high bit rate threshold and a low bit rate threshold.

13. A method for controlling the transmission of packets, the method comprising the steps of:
receiving a packet that belongs to a stream;
determining a quality of service level of the stream;
scheduling a transmission of the packet during at least one time slot in response to the quality of service level;
determining whether to compress the packet to provide a corresponding compressed packet, in response to at least one characteristic of at least one packet scheduled to be transmitted during the at least one time slot; wherein each quality of service level is associated with at least one bit rate threshold for transmitting packets belonging to a stream; wherein the at least one bit rate threshold comprising a high bit rate threshold and a low bit rate threshold; and
wherein the step of scheduling comprising scheduling the transmission of a received packet during a time slot in response to the high bit rate threshold.

14. A method for controlling the transmission of packets, the method comprising the steps of:
receiving a packet that belongs to a stream;
determining a quality of service level of the stream;
scheduling a transmission of the packet during at least one time slot in response to the quality of service level;
determining whether to compress the packet to provide a corresponding compressed packet, in response to at least one characteristic of at least one packet scheduled to be transmitted during the at least one time slot; wherein each quality of service level is associated with at least one bit rate threshold for transmitting packets belonging to a stream; wherein the at least one bit rate threshold comprising a high bit rate threshold and a low bit rate threshold; and
wherein the step of scheduling comprising scheduling the transmission of a received packet during a time slot in response to the low bit rate threshold.

15. A method for controlling the transmission of compressible packets, the method comprising the steps of:
receiving a packet that belongs to a stream;
determining a high bit rate threshold and low bit rate threshold associated with the stream;
scheduling a transmission of the packet during a first time slot in response to the high bit rate threshold and during a second time slot in response to the low bit rate threshold;
determining whether to compress the packet to provide a corresponding compressed packet, in response to at least one characteristic of at least one packet scheduled to be transmitted during the first time slot or the second time slot, wherein the determination includes a comparison between an aggregate size of the at least one packet scheduled to be provided to a selected communication channel during a time slot out of the first time slot or the second time slot as applicable, and an available capacity of the selected communication channel during the time slot.

16. The method of claim 15 further comprising a step of transmitting either the packet or a corresponding compressed packet in response to the determination.

17. The method of claim 15 wherein the step of scheduling comprising a step of selecting the selected communication channel out of a plurality of communication channels to provide the packet.

18. The method of claim 15 wherein the at least one characteristics comprising timing information.

19. The method of claim 18 wherein the timing information reflecting an upper time limit for transmitting the packet.

20. The method of claim 15 wherein the at least one characteristics comprise priority information.

21. The method of claim 15 wherein the at least one characteristic comprises packet size.

22. A method for controlling the transmission of compressible packets, the method comprising the steps of:
receiving a packet that belongs to a stream;
determining a high bit rate threshold and low bit rate threshold associated with the stream;
scheduling a transmission of the packet during a first time slot in response to the high bit rate threshold and during a second time slot in response to the low bit rate threshold;
determining whether to compress the packet to provide a corresponding compressed packet, in response to at least one characteristic of at least one packet scheduled to be transmitted during the first time slot or the second time slot;
wherein the step of scheduling comprising a step of selecting a communication channel out of a plurality of communication channels to provide the packet; wherein the step of determining comprising a step of determining whether to compress the packet to provide a corresponding compressed packet, in response to at least one characteristic of at least one packet scheduled to be provided to the selected communication channel during the first time slot or the second time slot;
and wherein the determination comprising a comparison between an aggregate size of the at least one packet scheduled to be provided to the selected communication channel during a time slot out of the first time slot and the second time slot and an available capacity of the selected communication channel during the time slot.

23. A method for controlling the transmission of compressible packets, the method comprising the steps of:
receiving a packet that belongs to a stream;
determining a high bit rate threshold and low bit rate threshold associated with the stream;
scheduling a transmission of the packet during a first time slot in response to the high bit rate threshold and during a second time slot in response to the low bit rate threshold;
determining whether to compress the packet to provide a corresponding compressed packet, in response to at least one characteristic of at least one packet scheduled to be transmitted during the first time slot or the second time slot;
at least one bit rate threshold out the high bit rate threshold and the low bit rate threshold reflects a quality level of the stream.

24. A method for controlling the transmission of compressible packets, the method comprising the steps of:
receiving a packet that belongs to a stream;
determining a high bit rate threshold and low bit rate threshold associated with the stream;
scheduling a transmission of the packet during a first time slot in response to the high bit rate threshold and during a second time slot in response to the low bit rate threshold;
determining whether to compress the packet to provide a corresponding compressed packet, in response to at least one characteristic of at least one packet scheduled to be transmitted during the first time slot or the second time slot; wherein at least one bit rate threshold out the high bit rate threshold and the low bit rate threshold reflects a compression level of a stream.

25. A system for scheduling the transmission of compressible and non-compressible packets, the system comprising:
 a packet storage medium, for receiving and storing packets and corresponding compressed packets;
 a compression unit, coupled to the packet storage medium, for receiving a packet, compressing the packet to provide a corresponding compressed packet and for providing the corresponding compressed packet to the packet storage medium;
 a storage unit, for storing a scheduling information for scheduling the transmission of packets and corresponding compressed packets; and
 a control unit, coupled to the packet storage medium, the compression unit, the storage unit and the compression unit for scheduling a transmission of packets, for determining which packets are to be compressed to provide corresponding compressed packets and for controlling the transmission of packets and corresponding compressed packets.

26. The system of claim 25 wherein the control unit is configured to schedule a packet in response to a quality of service information stored within the storage unit.

27. The system of claim 25 wherein the control unit is configured to schedule a packet in response to a quality of service information stored within the storage unit.

28. The system of claim 25 wherein a corresponding compressed packet replaces the packet.

29. The system of claim 25 wherein the packet storage medium is coupled to a communication channel, for transmitting packets and corresponding compressed packets over the communication channel.

30. The system of claim 25 wherein the control unit is configured to select a communication channel out of a plurality of communication channels to provide the packet.

31. The system of claim 25 wherein the control unit is configured to compress the packet to provide a corresponding compressed packet, in response to at least one characteristic of at least one packet scheduled to be provided to the selected communication channel during the at least one time slot.

* * * * *